W. P. & S. G. THOMSON.
INSULATED RAIL JOINT.
APPLICATION FILED DEC. 29, 1908.
964,338.
Patented July 12, 1910.
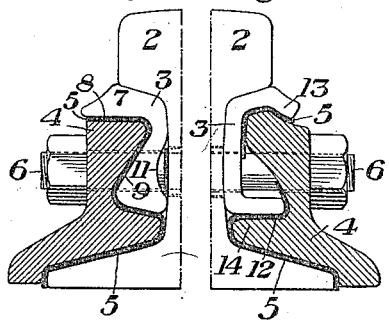
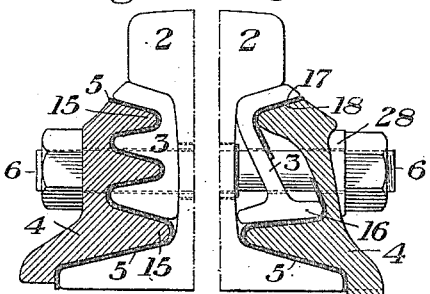
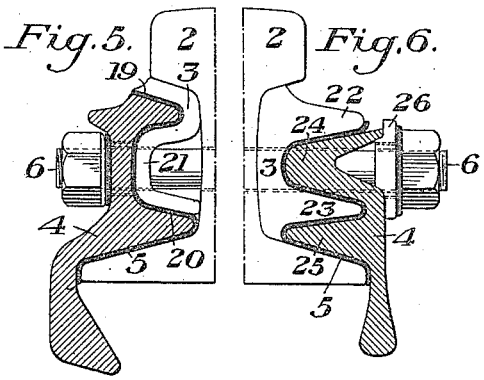
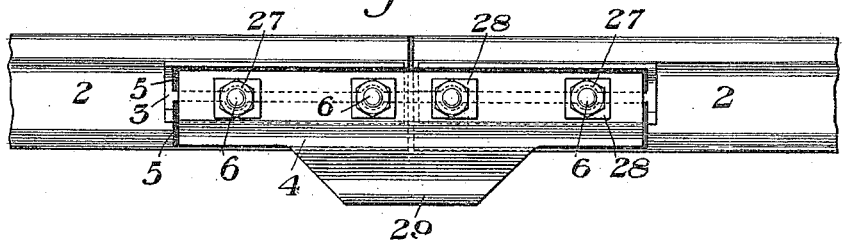

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

INSULATED RAIL-JOINT.

964,338.      Specification of Letters Patent.      Patented July 12, 1910.

Application filed December 29, 1908. Serial No. 469,853.

*To all whom it may concern:*

Be it known that we, WILLIAM P. THOMSON and SAMUEL G. THOMSON, both of Philadelphia, in the county of Philadelphia and State of Pennsylvania, have invented a new and useful Insulated Rail-Joint, of which the following is a full, clear, and exact description, reference being had to the accompanying drawings, forming part of this specification, in which—

Figures 1 to 6, inclusive, are sectional views illustrating different embodiments of our invention; and Fig. 7 is a side elevation of the joint shown in Fig. 4.

Our invention has relation to the class of insulated rail joints; and is designed to provide a joint of this character having an increased insulation bearing surface, acting as a substitute for the comparatively limited under surfaces of the rail heads. It is well known that in practice with the ordinary forms of insulated joints, the limited bearing area for the insulation at the undersides of the rail heads causes the insulation to pinch out at this point, and thus destroys the efficiency of the joint. Our invention makes it possible to increase to any desired extent the bearing area for the insulating material and thus greatly improve the durability and efficiency of the joint.

Our invention relates more particularly to insulated rail joints of the class which employs inner and outer bars; and it consists in providing inner bars each arranged to contact with one rail only, and having two or more laterally extending portions or members provided with insulation bearing surfaces at their under sides, these bearing surfaces acting as a substitute for the small under faces of the rail heads, together with outer bars which extend continuously across the joint opposite both rail ends and provided with coöperating bearing surfaces for the insulation.

Our invention will be best understood by reference to the accompanying drawings, in which we have shown a number of different embodiments thereof, which will now be described, it being premised, however, that these are illustrative only and that the invention is susceptible of various other embodiments without departing from its spirit and scope as defined in the appended claims.

In these drawings we have shown the invention as applied to tee-rails, but it is to be understood that it is equally adapted to rails of other sections and is in fact especially adaptable to girder rails of the street railway type.

In these drawings, the numeral 2 wherever seen, designates the joint rails; 3 designates the inner bars of the joint; 4 the outer bars; 5 the interposed insulation and 6 the joint bolts.

In the form of our invention shown in Fig. 1, the inner bar 3 is formed at its upper end with a laterally projecting member 7 having a horizontal bearing face 8 at its underside which extends beyond the edge of the rail head and which provides an extended bearing surface for the insulation 5 which is interposed between this bearing face and the upper horizontal face of the outer bar 4. The bar 3 is provided below the top member 7 with a downwardly and outwardly inclined face 9, and its lower edge forms a second bearing face for the insulation below the bolt holes. The insulation is shown as extending continuously between the inner and outer bars and also between the lower portion of the outer bar and the upper face of the base of the rail. The middle portion of the upright member of the inner bar is preferably diminished in thickness by being formed with a concave inner face 11, which decreases its weight and facilitates the punching of the bolt holes therethrough. It is obvious, however, that this inner face might be made to contact with the rail web throughout its entire extent without affecting the principle of the invention.

Fig. 2 shows the inner bar as being of substantially the same thickness throughout and as extending down along and in contact with the rail web, its lower end portion being turned outwardly to provide the horizontal insulation bearing face 12 on its underside; and its upper end portion being bent outwardly and downwardly as shown at 13 to provide an extended bearing surface for the insulation around the upper edge of the outer bar 4. In this form, the insulation, instead of being continuous, is in separate pieces, one piece being interposed between the portion 13 of the inner bar and the head of the outer bar 4; and the other piece being interposed between the bearing surface 12 and the inwardly projecting portion 14 of the outer bar, and also extending between the lower portion of the outer bar and the upper surface of the base of the rail. The upper piece of insulating material preferably extends downwardly to a sufficient extent to engage the joint bolts, thus preventing the insulation from slipping; and the upper edge portion of the lower insulation is preferably engaged with the joint bolts in the same manner and for the same purpose. However, the insulation in this form of joint may be made in one continuous piece as in Fig. 1.

In the form of joint shown in Fig. 3, the inner and outer bars are shown as each having several interfitting fingers, or laterally extending members 15, with a continuous piece of insulation interposed between them and also extending between the lower portion of the outer bar and the rail base. The number, size, shape and disposition of these interfitting, or intermeshing, members or fingers can be changed in various ways, as will be obvious, in order to multiply the number of bearing faces and increase the total area thereof, and thus decrease the pinching action between any two faces.

Fig. 4 shows the inner bar with a base portion 16 at its lower end, which extends the lower bearing face of the bar, the upper portion of the bar being bent outwardly underneath the rail head to provide the insulation bearing face 17 opposite the upper edge 18 of the head of the outer bar. The intermediate or web portion of the inner bar is shown as inclined outwardly and downwardly and joins the base portion 16 at the central portion of the latter, thereby giving a general I-beam shape to the lower portion of the bar to present a broad, rigid underbearing face with the least amount of metal. The outer bar has a deep girder flange in order to give the entire joint a maximum stiffness. The insulation is in general arranged similarly to that in Fig. 2, being shown as in two pieces.

Fig. 5 shows the inner bar as being of a general S-shape, with insulation bearing surfaces 19 and 20 above and below the bolts and generally similar to Fig. 1, except that it is of substantially uniform thickness such as is capable of being pressed into shape from a flat plate. The location of the underbearing faces 19 and 20 is similar to the construction and arrangement shown in Fig. 1, but the concave inner piece 21 forms a much deeper channel than it does in Fig. 1. The outer bar 4 is of the deep girder form; and a continuous piece of insulation is used between the two bars and between the outer bar and the base of the rail.

Fig. 6 shows an inner bar with two outwardly extending insulation bearing member or fingers 22 and 23, and an outer bar with its upper portion of general S-form, and having upper and lower members 24 and 25 extending under the upper and lower members 22 and 23, respectively, of the inner bar. A continuous piece of insulation is used between the two bars and between the outer bar and the base of the rail. A washer 26 is employed to span the outer recess in the outer bar in order to provide a gripping face for the bolts.

Fig. 7 shows a side elevation of Fig. 4 and indicates how the insulating material may be recessed at 27 to engage the bolts and thus prevent it from slipping end-wise. This figure also shows that the inner bars contact with one rail only, while the outer bar extends continuously across the joint, with its end portions opposite to the end portions of the two rails. 28 designates bevel washers or bolts used to provide vertical gripping faces for the nuts. The broadly depending flange 29, as shown, is designed to extend downwardly between the ties at the central portion of the outer bar, but it is obvious that this flange may be omitted entirely as in Figs. 1, 2 and 3; or that any other desired disposition of the metal may be made below the rail base without in any way departing from the essential feature of the invention. In the ordinary insulated joints, the difference in area between the underfaces of the rail heads and the tops of the rail bases is so great, that there is never any question as to which portion of the insulation material contacting with these faces first pinches out and thus permits metallic contact between adjacent insulation bearing face of the inner and outer bars. Our invention as can be readily seen, balances this difference in bearing areas, or even makes it possible to make the underbearing faces of the inner bar exceed the upper bearing on the rail bases. The multiplication of inverted or intermeshing member on the inner and outer bars can be indefinitely extended, the effect being to distribute the pinching action from two surfaces of relatively small areas to many surfaces of relatively large areas. It is apparent that two interfitting bars of this character could be padded with insulating material interposed between horizontally extending flexible members of the bars to such an extent that pinching out of the insulation would be impossible and the two bars would practically act as one. With such an arrangement, having separate inside bars each contacting with one rail only, and having an outside bar meshing therewith, and insulated from at least one of the inside bars, the stiff outside bar determines the stiffness of the joint, and enables the provision of an insulated joint which will have the same stiffness as the rails and one in which there is the least possibility of pinching out the insulating material. The greater the distance between the fishing angles of the rails, the greater, of course, is the possibility for this intermeshing feature; and for this reason, the invention is especially applicable to deep girder rails of the street railway type.

We claim:—

1. In a rail joint, an inside bar having at least two laterally extending members above the rail base and each formed with insulation bearing faces on the under sides thereof, another bar extending under each of said faces and having a flange to extend inwardly between the inside bar and the top face of the rail foot, and insulating material between the two bars.

2. In a rail joint, an inner bar having at least two laterally extending under faces above the rail base, and an outer bar extending under each of said faces, said outer bar having a flange extending inwardly between the inner bar and the rail base, and insulating material between said flange and the rail base.

3. In a rail joint, an inner bar arranged to contact with one rail only and to stand free from the rail foot and having at least two laterally extending faces above the rail base, an outer bar extending under said faces, and insulating material interposed between the two bars.

4. In a rail joint, inner and outer bars, said outer bar having at least two laterally extending members above the rail base with an insulation bearing face on the upper side of each of said members, said outer bar also having a flange, with an insulation bearing face on its under side, to extend inwardly between the inner bar and the rail foot, said inner bar contacting with one rail only and insulated from said outer bar.

5. In a rail joint, inner and outer bars, said outer bar having at least two laterally extending upper bearing faces for insulating material above the rail base and having a flange extending inwardly between the inner bar and the rail base, said outer bar extending opposite both rails of the joint, and said inner bar supported by and insulated from said faces and contacting with one rail only.

6. In a rail joint, an outer bar extending opposite both joint rails and having a flange extending inwardly and having an under bearing face for insulation interposed between it and the rail foot, said bar having at least two laterally extending upper bearing faces for insulation, an inner bar to contact with one rail only and having at least two laterally extending under bearing faces for insulation, and insulating material interposed between said insulation bearing faces.

7. In a rail joint, an outside bar having a plurality of laterally extending upper faces above the rail base to form bearings for insulating material, and another bar standing free from the rail foot and extending over and insulated from each of said faces.

In testimony whereof, we have hereunto set our hands.

WILLIAM P. THOMSON.
SAMUEL G. THOMSON.

Witnesses:
S. E. PATTERSON,
McLEOD THOMSON.